United States Patent [19]

Finkelstein et al.

[11] Patent Number: 5,115,420
[45] Date of Patent: May 19, 1992

[54] UTILIZING WASTED LASER LIGHT IN OPTICAL SYSTEMS

[75] Inventors: Blair I. Finkelstein, Tucson, Ariz.; Terry W. McDaniel, Morgan Hill, Calif.

[73] Assignee: International Business Machines Corporation, Armonk, N.Y.

[21] Appl. No.: 465,849

[22] Filed: Jan. 16, 1990

[51] Int. Cl.$^5$ ............................................. G11B 7/00
[52] U.S. Cl. ................................ 369/44.14; 369/107; 369/112
[58] Field of Search ................ 369/44.14, 116, 121, 369/112, 107, 44.23; 250/201.5

[56] References Cited

U.S. PATENT DOCUMENTS

| | | | |
|---|---|---|---|
| 3,905,703 | 9/1975 | Matsumoto | 356/106 |
| 4,409,631 | 10/1983 | Matsumoto | 369/110 X |
| 4,447,722 | 5/1984 | Saimi | 250/216 |
| 4,660,187 | 4/1987 | Yoshino et al. | 369/13 |
| 4,725,721 | 2/1988 | Nakamura | 250/201 |
| 4,742,505 | 5/1988 | Takeuchi et al. | 369/106 X |
| 4,823,220 | 4/1989 | Milster et al. | 369/13 |

OTHER PUBLICATIONS

Maissel et al, "Handbook of Thin Film Technology", pp. 11-10 through 11-12; McGraw-Hill Book Co., 1970.

*Primary Examiner*—Robert L. Richardson
*Attorney, Agent, or Firm*—H. F. Somermeyer

[57] ABSTRACT

A laser in a magneto optical recorder supplies a laser light beam to be used in processing signals to and from a magneto optical record member. The laser beam is split into two portions. A first portion is the data beam which is directed to impinge upon a magnetooptic storage member. A second portion is so-called wasted light which is directed away from the storage member. The wasted light is intercepted by a mirror and reflected into a beam splitter to phase-coherently combine with light reflected from the storage member for improving signal-to-noise ratio of the reflected storage member light beam. This action improves signal-to-noise ratio and enhances servo operation in the focusing position control of the optical head with respect to an optical storage medium. The focus control signal derived from the reflected light is not only used to control the focus of an objective lens in the system but also for positioning the mirror in synchronism with the movement of the storage member along the axis of the objective lens so that the phase-coherence of the wasted light beam and the data beam is maintained.

16 Claims, 1 Drawing Sheet

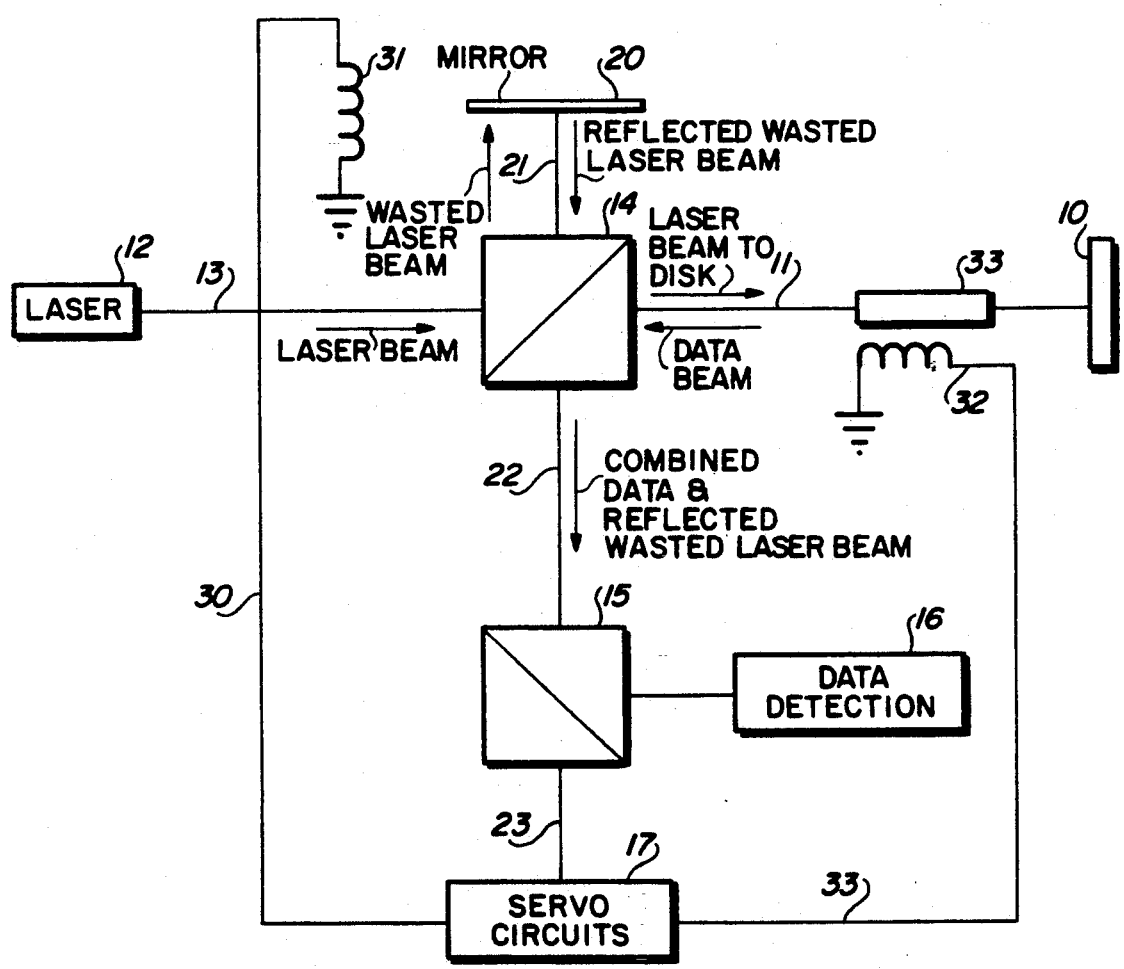

UTILIZING WASTED LASER LIGHT IN OPTICAL SYSTEMS

FIELD OF THE INVENTION

The present invention relates to optical signal processing systems, particularly those signal processing systems employable with optical disk recorders.

BACKGROUND OF THE INVENTION

Magnetooptic recorders sense information magnetooptically recorded on an optical disk by detecting the rotations of the linear polarization of light, such as caused by the well-known Kerr effect. The servo mechanisms for focusing track following and seeking for such magnetooptic recorders still employ the intensity-modulated reflected light caused by focus differences and track-following or track-seeking differences. It is desired to provide a better signal-to-noise ratio of the intensity-modulation portion of the reflected light beam for enhancing focus and tracking servo operations.

DISCUSSION OF THE PRIOR ART

The use of first-surface planar mirrors in optical systems, of course, is per se, known. For example, Yoshino et al., in U.S. Pat. No. 4,660,187, shows a light-signal reading method in which a first light beam is modulated to a polarized state in accordance with information magnetooptically recorded on a recording medium. The first light beam interferes with a second light beam of a frequency different from that of the first light beam. The information is then detected as a variation in intensity of the resulting interference light. Optical mixing of the two beams occurs within a polarization beam splitter. The output of the mixed optical signals is filtered by an optical analyzer, which passes the s-component light of the reflected light beam to a data detector. The system requires a frequency shifter for the s-component light beam to achieve such operation.

Milster et al., in U.S. Pat. No. 4,823,220, shows various mirror combinations for combining the p and s components of a magnetooptically-reflected light beam (having linear-phase polarizations which are rotated and represented by p and s components in the readback light beam, as is known), combined in such a way as to produce an intensity-modulated light beam for signal detection. This system requires various phase plates and mirrors for achieving the output intensity-modulated light beam.

Leon I. Maissel et al., in the book "Handbook of Thin Film Technology" published by McGraw-Hill Book Company, Copyright 1970, on page 11-11, shows a so-called Michelsen interferometer. The Michelson interferometer, of course, is well known, as it was originated in the 1880's. This interferometer measures film thicknesses, for example, through the use of a pair of mirrors which are then combined in a beam splitter. One of the mirrors, which is movable, reflects light passed through the thin film to be measured. The mirror is moved such that the light path length of the test portion of the interferometer produces predetermined interference fringes. These figures indicate the thickness of a thin film.

SUMMARY OF THE INVENTION

It is an object of the present invention to provide for an enhanced servo-mechanism operation by utilizing so-called wasted laser light in a magnetooptic recorder.

It is another object of the present invention, to provide enhanced operation in an optical system through the use of a mirror, which is adjusted in accordance with predetermined operational parameters of the optical system.

In accordance with the present invention, an optical recording device, having a relatively movable optical head and an optical storage member in an optical-signal transferring relationship, wherein the head supplies a wasted light beam, which does not impinge upon the storage member, and a data beam which impinges upon, and is reflected by the storage member. The wasted light beam is redirected, such as by a first-surface planar mirror, and is adjusted to be in phase with the reflected light beam for being phase-coherently combined with the reflected light beam for increasing its light intensities. In a magnetooptic system, information is carried in the reflected data beam by polarization-phase rotations, which are not affected by the phase-coherence combination of the reflected-wasted light beam and the data beam. Servo-mechanism circuits control the focus and tracking of the data beam with respect to the storage member.

In a preferred form of the invention, the focus control signal is also utilized for positioning a mirror, which reflects the wasted light beam for maintaining a constant relationship between the path links of the data beam and the wasted light beam, thereby maintaining phase-coherence. It is also desired that the control of the mirror, reflecting the wasted light, be more precisely controlled in the focus control.

The foregoing and other objects, features, and advantages of the invention will be apparent from the following more particular description of the preferred embodiments of the invention, as illustrated in the accompanying drawings.

DESCRIPTION OF THE DRAWING

The single FIGURE diagrammatically illustrates incorporation of the invention into an optical recorder.

DETAILED DESCRIPTION OF THE DRAWING

Referring now more particularly to the drawing, a magnetooptic storage member 10, in the form of a rotating disk, receives laser light over a bidirectional light path 11, from a laser 12, for recording and sensing signals onto the storage medium and from storage member 10, using known magnetooptic principles. The light in path 11 reflected from magnetooptic storage member 10 exhibits rotation of its linear polarization by the known Kerr effect for carrying information-bearing signals magnetically recorded on the magnetooptic storage member 10. The light from laser 12 passes along light path 13 through usual beam shapers and collimators (not shown), thence to the phase-polarization beam splitter (hereinafter beam splitter) 14. The polarization of the light traveling from laser 12, along path 13 is such that it passes directly through beam splitter 14 to path 11 for transmission as a laser-beam-to-disk to magnetooptic storage member 10. A portion of the light from laser 12 is reflected from beam splitter 14 along path 21, as a wasted laser beam such that it does not impinge upon, or goes away from, storage member 10.

The arrangement of beam splitter 14 is such that the light returned along path 11, from storage member 10, is reflected along path 22 to a second beam splitter 15. It is preferred that beam splitters 14 and 15 be identically constructed a to their respective reflective and light transmissive characteristics. A portion of the light is redirected by beam splitter 15 to a data detection circuit and optical processing means 16. Such data detection means 16, can be the usual magnetoopticdata detection systems, as is well known. A portion of the light from light path 22 is transmitted through beam splitter 15 along path 23 to a detector (not shown) in servo circuit 17. Such detector generates focus error signals and tracking or seeking error signals, as is known in the art. The intensity variations of the reflected light beam transmitted along path 23, its shape and orientation, with respect to the detector in servo circuit 17, is used to generate the focus and position error signals. An aspect of the light traveling along path 23 is its intensity. Because of elements in an optical system, optical noise occurs. It is desired to reduce this optical noise for enhancing the operation of servo circuit 17. The position error signals used in relatively transversely positioning the objective lens 33, with respect to a track (not shown) being followed or radially moved across on storage member 10, are not detailed, as they bear no effect on generation of controls for understanding the present invention.

The focus portion of servo circuit 17 generates a focus controlling signal, part of which is supplied over line 30 to a mirror actuator 31, herein represented as a coil. Actuator 31 is mechanically connected to a first-surface planar mirror 20, which intercepts and reflects the wasted light on light path 21 as a reflected wasted laser beam. It is desired to phase-coherently add the light reflected by mirror 20 to the light reflected by storage member 10 as a combined data and reflected wasted laser beam. This phase-coherence combination occurs in beam splitter 14 in the transmission of light from path 21, through the beam splitter 14 to path 22, and the redirection or reflection of the light along path 11 from storage member 10 to path 22. The spacing between storage member 10 and beam splitter 14, and mirror 20 and beam splitter 14, is controlled such that the relative spacing between the beam splitter and the storage member and the planar mirror, is maintained to create phase-coherence of the intensity modulation of the two light beams. In this manner, the intensity of the light beam reflected by storage member 10 is increased for increasing the signal-to-noise ratio to be used in servo circuit 17 controls. Such increased signal-to-noise ratio improves both the focusing and position-error servo-controlling operations.

The focus servo supplies its focusing control signal over line 33 to a focus actuator 32, herein represented as a coil, which is operatively mounted on, or connected to, an objective lens 33. In a known manner, the signals on line 33 flow into actuator 32, relatively moving objective lens 33, with respect to disk 10, for maintaining the light beam traveling along path 11 from beam splitter 14 to storage member 10 in focus at the recording level of the storage member 10. This operation is well known and not further described for that reason. Since the focus control signal on line 33 is indicative of path-length changes between beam splitter 14 and storage member 10, a signal is derived from and directly proportioned to the line 33 focus drive signal to be supplied to actuator 31 for providing synchronizedproportional movements of mirror 20 along the length of light path 21, as disk 10 moves away from objective lens 33, mirror 20 is moved further from beam splitter 14, and vice versa. This action compensates the wasted light path 21 length at the focus error as the focus changes, which is representative of path-length changes of light beam 11.

To produce stable phase-coherence between the reflected wasted light beam and the reflected data or reading beam, the optical path links can be maintained constant within approximately 0.067 of a wavelength of the light being used in the system. The spatial-coherence length between interfering light beams also should exceed the total travel distance of the light from the point of creation of the coherent beams to the point of the coherent fringe combination. The coherence length is readily established by the amplitude division of the wavefronts by beam splitter 14. This spatial-coherence length can be achieved independently of the inherent spatial coherence of the light emanating from laser 12, which has a coherence length less than one millimeter. For example, the first condition of controlling the relative path links requires tracking the actual runout of storage member 10; i.e., movement of storage member 10 along the axis of light path 11, which is focus. The focus servo portion of servo circuit 17, slaves the motion of the objective lens to the actual motion of the storage member 10 recording surface. This very same mechanical motion control, which requires movement in the order of 100 micrometers or more, is used in the present invention for compensation of the variability of the length of light path 11. It is preferred that the compensatory motion of mirror 20 match that of the objective lens 33. With this compensatory motion of mirror 20, and use of the combination of reflected light from path 21 being phase-coherently combined with the reflected light from storage member 10, the signal-to-noise ratio for servo operation is enhanced.

When mirror 20 is of high quality the storage member 10 has a reflectance of about 25 percent, the signal power enhancement of light in path 22 can be in the order of 9.5 decibels. The light intensity provided to the data detection mean 16 also increases, but to about seven decibels. As a result of the mirror 20 being installed and controlled as described, an effective 2.5 decibel gain in shot noise, signal-to-noise ratio is achieved. This value is independent of the particular value of the transmission and reflectivity parameters of beam splitters 14 and 15. It is also important to choose high-quality beam splitters 14 and 15 for controlling the feedback to laser 12. With mirror 20 installed, an increased laser feedback has been noted; this increase in feedback can be minimized by providing high- quality beam splitters 14 and 15. Significant light-intensity increases at the servo circuit 17, in particular, as well as in data detection means 16, provides for enhanced operation through increasing signal-to-noise ratio.

The transmissive and reflective parameters of beam splitters 14 and 15 are selected to optimize overall optical performance; this selection takes into account both recording magnetooptically on storage member 10, and reading or sensing the recorded information of storage member 10. All data detectors, such as data detection means 16, have a shot-noise generation, which detracts from faithful signal detection. The presence of mirror 20 in the optical system facilitates finding an optimal solution for the design of an optical recorder of the magnetooptic type.

While the invention has been particularly shown and described with reference to a preferred embodiment thereof, it will be understood by those skilled in the art, that various changes in form and details may be made therein without departing from the spirit and scope of the invention.

What is claimed is:

1. In an optical recording device having a relatively-movable optical head and an optical storage member, which are in a signal-transferring relationship, wherein the head supplies a wasted light beam, which does not impinge on the storage member, and a data beam which impinges upon the storage member and is reflected back to the head as a reflected light beam, including, in combination:

first means for receiving and redirecting the wasted light beam and including phase means for adjusting the phase of the redirected light beam to be in phase with the reflected light beam, and second means in optical communication with said first means for combining the reflected light beam with said redirected light beam for generating a single light beam of greater light intensity than said reflected light beam.

2. In the device set forth in claim 2, wherein the data beam is light-polarization modulated by the storage member for carrying data recorded on the storage member, and means receiving the reflected light to detect the data carried in the reflected light beam, and servo means connected to the head being responsive to the intensity of the light beam as increased for controlling the head for maintaining same in a signal-transferring relationship to the storage member.

3. In the device set forth in claim 1, further including, in combination:

a beam splitter in the head for directing the data beam along a light path leading to and from the storage medium and for directing the wasted light beam along a second light path leading in another direction; and mirror means positioned with respect to the beam splitter to reflect the wasted light back into the beam splitter for combining with the reflected light beam.

4. In the device set forth in claim 3, further including, in combination:

said mirror means being movable with respect to the beam splitter along said second light path toward and away from the beam splitter;

servo means operatively connected to the head for maintaining focus of the data beam at the storage member and being connected to the mirror mean for moving same along the second light path as the focus of the data beam is maintained, such that a distance the, wasted light beam travels varies with the focussing actions to keep phase-coherence between said reflected and wasted light beams in said beam splitter.

5. In the device set forth in claim 4, further including, in combination:

said servo means including detector means positioned to receive said reflected light beam from said beam splitter and being responsive t intensities of the reflected beam to focus the data beam on the storage member.

6. In the device set forth in claim 5, further including, in combination:

said storage member being a magnetooptic storage member which modulates the data beam by rotating a linear polarization of the data bean in accordance with any remanent magnetization of the storage member at a point of impingement of the data beam on the storage member;

a second beam splitter optically interposed between the first-mentioned beam splitter and said servo detector for directing a portion of the reflected beam along a third path of light other than toward said servo detector; and a magnetooptic detector positioned to intercept light traveling along said third path for detecting data carried by the reflected light beam as rotations to the linear polarization of the reflected light beam.

7. In a method practices in an optical disk player for optically processing light supplied over a first light path to a moving data storage member and being reflected from said moving data storage member over said first light path and in which light supplied to the data storage member to be reflected back to the head by the data storage member is a first portion of light in an optical head and a second portion of light in said optical head moves away from the data storage member;

the method including the steps of:

sensing any changes in the length of travel in said first light path of said first portion of light travelling to and from the data storage member;

directing said second portion of light along a variable length light path;

varying the length of said variable-length light path to make the path length variations optically identical to the sensed changes of said first path length for maintaining a predetermined-phase relationship between the light in said first and second portions at a predetermined location which is in optical communication with said first and variable length paths for receiving both said portions of light; and combining the first and second portions of the light at said predetermined location for producing a single beam of light therefrom.

8. In the method set forth in claim 7, further including the steps of:

providing a mirror for reflecting said second portion of light; and varying the position of the mirror from said predetermined location for maintaining phase-coherence of said first and second light portions at said predetermined location.

9. In the method set forth in claim 8, further including the steps of:

continuously focusing the first portion of light onto the data storage member; and analyzing the continuous focusing for indicating the changes in length in said first light path resulting from focusing the first portion at the data storage medium, adjusting the length of the variable-length light path for matching said changes in length of said first light path including moving the mirror to and from said predetermined location for varying the light travel distance of said second portion of light over said variable-length light path to match the light travel distance to any changes in travel length by said first portion over said first light path, such that the travel length of said second portion varies with the length of travel by said first portion over said first path caused by said focusing the first portion of light at said data storage member.

10. In the method set forth in claim 9, further including the steps of:
   providing a beam splitter to generate said first and second portions and locating said predetermined location in said beam splitter.

11. In the method set forth in claim 8, further including the steps of:
   modulating the first portion of light by rotating its linear polarization for carrying information-bearing signals in the modulation;
   after the polarization modulation of the first portion, performing said combining of the portions at said predetermined locations; and
   detecting data from the combined light by detecting said modulation and detecting servo information from the combined light by detecting the intensity reinforced first portion of light.

12. In an optical system, means for enhancing reflected light being transmitted within the optical system, the improvement including, in combination:
   first means for dividing an original light beam into first and second beams, respectively, travelling along first and second independent paths;
   an optical storage member in the first path and having a recording surface which reflects said first beam back into the first path with modulation indicative of information stored in the optical storage member;
   a first-surface mirror member in the second path for reflecting the second beam back into the second path;
   optical-combining means optically coupled to the first and second paths for receiving the reflected light from the first and second beams for optically combining same; and
   servo means coupled to said first and second paths for adjusting the path lengths for maintaining a predetermined constant relative length of said first and second paths, such that a constant phase relationship between the first and second reflected light beams is maintained in said optical-combining means.

13. In the optical system set forth in claim 12, further including, in combination;
   said optical storage member being a magnetooptic storage member, wherein the modulation is a rotational modulation of a linear polarization in the first light beam;
   said servo means being coupled to the combining means for receiving the combined reflected light beam and being responsive thereto to maintain said relative lengths of said first and second paths; and
   data detection means connected to the combining means for receiving the combined light beam for detecting the modulation of the reflected light beam 14. In the system set forth in claim 12, further including, in combination:
   said servo means having a signal response characteristic for maintaining the relative lengths of said first and second paths to not greater than about 0.1 wavelength of light in said original light beam.

15. In the system set forth in claim 12, further including, in combination:
   said servo means being coupled to said optical storage member and said combining means and being operative to maintain the length of the second path to a predetermined focus condition and being coupled to said mirror and to said combining means for varying the length of the second path as the focus maintenance varies the length of the first path.

16. In an optical storage system wherein a laser supplied an original light beam, a beam splitter receives the original light beam and splits same into a data beam and a wasted beam, an optical storage member is arranged to receive and reflect the data beam back to the beam splitter and the wasted beam is directed to be intercepted by the optical storage member, a data detector is optically coupled to the beam splitter for receiving at least a part of the reflected data beam for detecting data carried thereby, a focusing lens optically interposed between the beam splitter and the optical storage member for focusing the data beam onto the optical storage member;
   the improvement including, in combination:
   reflecting means for intercepting the wasted beam and reflecting same back to the beam splitter;
   servo means coupled to the beam splitter and to said focusing lens for receiving a part of the reflected data beam for measuring focus condition for actuating the focusing lens to move toward or away from the optical storage member for maintaining a predetermined focus condition and being coupled to the reflecting means for coordinated motions consonant with the focusing lens movements such that the recombination of the data and wasted beams are in a predetermined constant phase synchronization for enhancing the intensity amplitude of a combined reflected beam which is greater that the intensity of the reflected data beam such that the servo means receives its part of the reflected beam at a greater signal-to-noise ratio than the signal-to-noise ratio of the reflected data beam.

* * * * *